(12) United States Patent
Bonvin et al.

(10) Patent No.: US 6,468,326 B1
(45) Date of Patent: Oct. 22, 2002

(54) METHOD FOR IN-LINE FILTERING OF A LIQUID METAL AND IMPLEMENTING DEVICE

(75) Inventors: Emmanuel Bonvin, Sanetsch; Eric Wuilloud, Venthone, both of (CH)

(73) Assignee: Membratec S.A., Sierre (CH)

( * ) Notice: Subject to any disclaimer, the term of this patent is extended or adjusted under 35 U.S.C. 154(b) by 0 days.

(21) Appl. No.: 09/743,308

(22) PCT Filed: Jul. 8, 1999

(86) PCT No.: PCT/CH99/00306

§ 371 (c)(1),
(2), (4) Date: Jan. 8, 2001

(87) PCT Pub. No.: WO00/03045

PCT Pub. Date: Jan. 20, 2000

(30) Foreign Application Priority Data

Jul. 9, 1998 (FR) .......................................... 98 08968

(51) Int. Cl.⁷ ................................................. C22B 9/02
(52) U.S. Cl. ............................. 75/407; 75/411; 75/412; 266/227
(58) Field of Search ......................... 75/407, 411, 412; 266/227

(56) References Cited

U.S. PATENT DOCUMENTS 2,913,118 A  11/1959  Coleman et al.
5,114,472 A  * 5/1992  Eckert et al. ................. 75/712

FOREIGN PATENT DOCUMENTS

| EP | 0 291 580 | 11/1988 | |
|----|-----------|---------|---|
| FR | 2 669 041 | 5/1992 | |
| GB | 1 262 933 | 2/1972 | |
| GB | 1 367 069 | 9/1974 | |
| JP | 63 140070 | 6/1988 | |
| JP | 40346629 | * 12/1992 | .................. 75/407 |

OTHER PUBLICATIONS

"Tubular ceramic filters for aluminum", Engineers Digest, vol. 33, No. 8, Aug. 1972, p. 29 XP002118504, U.S.A.

* cited by examiner

Primary Examiner—Melvyn Andrews
(74) Attorney, Agent, or Firm—Davis & Bujold, P.L.L.C.

(57) ABSTRACT

A device for an in-line filtering (10) of a liquid metal, by using only a single installation, to obtain a very good filtering of any liquid metal whatever its melting point. The device comprising a treating chamber (11) made of refractory material and having an inlet (12) for supplying the metal liquid to be filtered, an element for cleaning (16) the metal, and an element for degassing (17) the cleaned metal. The degassed metal is then injected, under pressure via an injection pump (18), into a porous filtering element (19) and injected liquid flows tangentially to a filtering surface of the filtering element (19) for filtering the metal while simultaneously cleaning the filtering surface. Under the effect of the applied pressure, a portion of the degassed metal passes through the filtering element (19), which is enclosed by a chamber (20), and the filtered liquid is evacuated through an output port (21) provided in the treating chamber (11). The unfiltered liquid metal, which contains all the impurities, is re-introduced back into the treating chamber (11), via a conduit (22) which includes pressure and flow regulator (23), for further processing. A method for in-line filtration of a liquid metal is also disclosed.

15 Claims, 1 Drawing Sheet

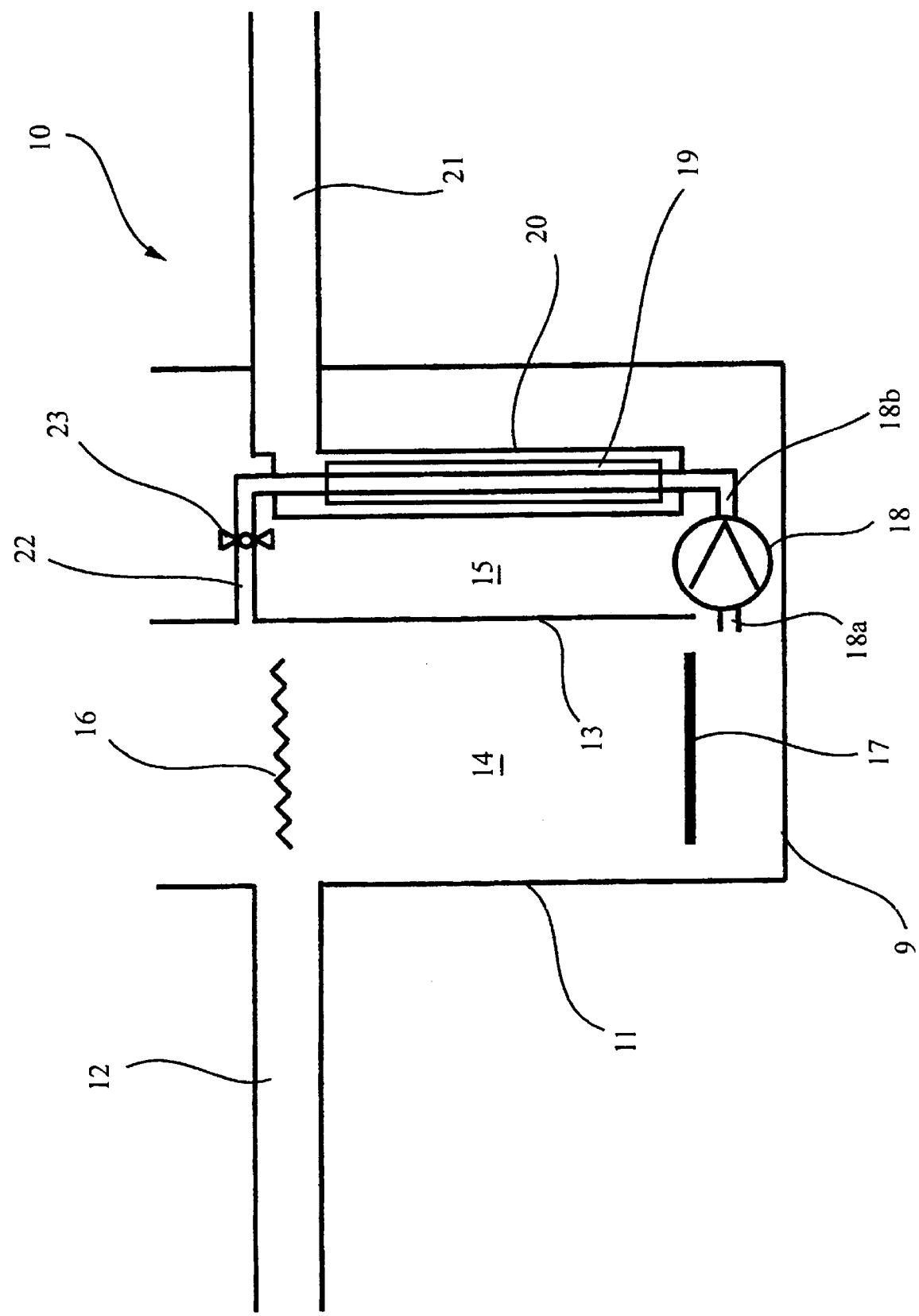

METHOD FOR IN-LINE FILTERING OF A LIQUID METAL AND IMPLEMENTING DEVICE

TECHNICAL DOMAIN

The present invention concerns a method for filtering a liquid metal, specifically aluminum, in which the first step consists of introducing the liquid metal into a treatment chamber, then cleaning and degassing the metal, and the second step consists of injecting the degassed metal into a porous filtration element.

It also concerns a device implementing the method, comprising a treatment chamber made of refractory material with a channel admitting the liquid metal to be filtered, an element for cleaning said metal, and an element for degassing the cleaned metal, said treatment chamber comprising a degassing chamber and a filtration chamber which are partially separated by a wall.

PRIOR ART

The demand for high quality metal elaboration is constantly increasing, necessitating the filtration of liquid metal in order to obtain a product free of impurities. Technical solutions based on current knowledge are meeting with limited success in terms of both product quality and economics. The various methods and devices for treating liquid metal in current use are operational only after several metal elaboration phases have taken place. These operations are both costly and time consuming, and they offer only linear effectiveness, expressed in terms of the percentage of inclusions eliminated.

Various procedures for treating liquid metal have been proposed, specifically, injecting gas using graphite rods, a rotor, graphite diffusers, or frontal filtration on a ceramic filter. The majority of industrial installations currently use a combination of two or even three of these techniques. These methods are expensive and none of them succeeds in completely filtering out inclusions.

Publication No. FR 2 669 041 discloses a device in the form of a case divided vertically into two compartments which communicate at the base of the case. In the method used with this device, the metal is degassed and stripped of oxides by a rotor which rotates in the first compartment, and then filtered through a ceramic filter disposed horizontally in the second compartment before being transferred to a receptor system.

The filter described in document GB 1 262 933 is designed to retain the impurities from a liquid metal in fusion, particularly aluminum and its alloys; it comprises a series of parallel tubular filtration elements connected to a filtration plate of particles resistant to molten aluminum and joined by premelted glass. This filter is located at the heater outlet so the metal passes through it before being molded and solidified into ingots.

In addition, European Publication No. EP 0 291 580 describes an in-line degassing and filtering device for molten metal with a receptacle divided into two chambers. The first chamber is for degassing the metal with two cylinders made of porous material located at the end of gas injection conduits, and the second chamber, which has an inlet defined by a plate made of porous material such as a ceramic, is designed for filtering the degassed metal.

Document GB 1 367 069 proposes a method for continuously eliminating metal constituents from liquid metal in a receptacle separated into two compartments communicating through a bed of granular refractory material. The metal is agitated in the first compartment using an agitation device angled at 45°.

In all these devices, as well as the device which is the object of U.S. Pat. No. 2,913,118, which is limited to use with alkaline electrolytic metals such as sodium, filtration is performed frontally and not tangentially, and the stream of metal to be purified is not separated into two distinct streams to allow thorough filtration.

The subject of the abstract of Japanese Patent Application No. 63 140070 is an apparatus designed for frontal filtration of fine impurities in a heated bath such as a galvanizing dip. This apparatus comprises a receptacle divided into two compartments by a ceramic filter in the form of a plate designed to retain the impurities circulating through the bath. This apparatus is merely a simple liquid filtration device which is not suitable for liquid metal.

DESCRIPTION OF THE INVENTION

The present invention proposes to overcome the disadvantages of the prior art with a method and a device implementing the method, which eliminate all operations or installations affecting metal quality located upstream of the filtration device, and which use only a single installation to achieve very high quality filtration of any liquid metal, whatever its melting point. This high quality filtration results from the fact that the liquid to be purified is separated into two distinct streams, one purified stream which is sent through the outlet canal of the device and one stream containing all the impurities, which is returned for a second treatment. This separation of the stream of cleaned, degreased metal is achieved by subjecting the liquid metal to pressure before filtration.

This goal is achieved by the method of the invention as described in the preamble and characterized in that the pressurized liquid metal is injected at high speed into the filtration element, tangentially to the surface of said element, while maintaining a flow of liquid on said surface to clean the surface while simultaneously filtering said metal; in that the filtered portion of the metal is evacuated after passing through said filter element, and in that the remaining, unfiltered portion of the metal is re-introduced into said treatment chamber for a second treatment.

It is advantageous to increase the effectiveness of cleaning the surface of the filtration element by varying the speed at which the liquid metal circulates in said element, or by creating a turbulence in the liquid metal at the surface of said filtration element.

The filtration device implementing the method of the invention, as defined in the preamble, is characterized in that it comprises at least one pump with an inlet terminal and a recirculating terminal, which injects the degassed metal tangentially into at least one porous filtration element located in an enclosure with an exit channel for the filtered metal, a means for reintroducing the non-filtered portion of liquid metal into the treatment chamber, and a means for regulating flow and pressure of the non-filtered metal.

Advantageously, the filtration element is located between the injection pump and the pressure and flow regulating means, with the upstream extremity of said element being connected to the recirculation terminal of said injection pump and its downstream extremity connected to said pressure and flow regulating means through a conduit leading to the wall of the treatment chamber which allows the non-filtered portion of metal to be reintroduced in preparation for a second treatment.

The cleaning element and the degassing element are preferably located in the degassing chamber, and the injection pump, the filtration element, and the pressure and flow regulators are located in the filtration chamber.

The admission terminal on the injection pump is advantageously located in the space defined by the base of the treatment chamber and the degassing element.

The size of the pores preferably varies depending upon the quality of metal filtration desired.

Depending upon the embodiment, the filtration element may be a tubular element comprising at least one longitudinal channel.

Preferably the filtration element, the injection pump, and the pressure and flow regulating means are made of either ceramic, graphite, or a porous refractory metal.

SUMMARY OF THE DRAWING

The present invention will be better understood with reference to the description of one preferred embodiment furnished as a non-limiting example and to the attached drawing, in which the only drawing is a schematic representation of the device of the invention.

HOW TO CARRY OUT THE INVENTION

The liquid metal in-line filtration method according to the invention consists of subjecting said metal to pressure using a liquid metal pump and passing it over one or more porous filtration elements with pores that are fine enough to retain all the impurities and inclusions on the surface. The porosity and average pore size of this filtration element vary depending upon the liquid metal, the operating parameters, and the ultimate use for the product being filtered. In addition, to prevent the rapid accumulation of impurities on the surface of this element which would clog it prematurely, the stream of liquid flows tangentially to the filtration surface and is maintained by the pump. The tangential component of the flow speed is regulated by pressure regulating means and kept high enough to effectively eliminate impurities and inclusions that might accumulate on the surface of the filtration element. The portion of the liquid metal which has not passed through the filtration element is returned upstream of the injection pump for a second treatment. The impurities and inclusions present are thus partially eliminated by a cleaning system in the liquid metal bath and by a liquid metal degassing system.

With reference to the drawing, filtration device 10 used with the method of the invention comprises a chamber 11 made of refractory material adapted to the temperature of the metal to be filtered, into which the liquid metal for filtration is introduced through a liquid inlet channel 12. This chamber 11 is divided into two portions by a generally median, partial vertical wall 13 defining a degassing chamber 14 and a filtration and evacuation chamber 15. Degassing chamber 14, into which liquid inlet channel 12 opens, is provided with a cleaning element 16, known in the art, located at the inlet channel, that is essentially at the surface of the liquid metal bath. It also comprises a degassing element 17, known in the art, located in the lower portion. Filtration and evacuation chamber 15 comprises, in its lower portion, a pump 18 for tangentially injecting degassed liquid metal into a porous filtration element 19. Pump 18 is equipped with an inlet terminal 18a located in the area defined by base 9 of chamber 11 and degassing element 17, and a recirculation terminal 18b connected to filtration element 19. Filtration element 19 is vertically disposed in an enclosure 20 having a horizontal outlet channel 21 for the filtered metal opposite inlet channel 12 and it opens, in vertical wall 13, above cleaning element 16, through a horizontal conduit 22 forming the means for reintroducing the non-filtered portion of the metal into treatment chamber 11. Conduit 22 is equipped with a means for regulating the flow and pressure of the metal reinjected into the device. Treatment chamber 11 is further equipped with a temperature maintenance system, not shown, which is known in the art and therefore will not be described.

Porous filtration element 19, which is tubular in the example shown, has peripheral pores, the size and arrangement of which (either symmetrical or asymmetrical) are adapted to the type of metal being filtered. This filtration element, as well as pump 18 and the pressure and flow regulator 23, are preferably made of ceramic, graphite, a porous refractory material, or some other similar material suited to this purpose.

When the metal begins to flow, it enters through inlet channel 12 into degassing chamber 14 in chamber 11 where it is first cleaned by cleaning element 16 to eliminate the more gross impurities, then degassed by degassing element 17 to eliminate dissolved hydrogen and activate flotation of a portion of the inclusions present in the liquid metal. Next the metal passes into filtration and evacuation chamber 15 by being injected into a filtration element 19 by pump 18 in such a way that the flow of metal is always tangential to the surface of this element. Under the effects of the pressure applied, a portion of the metal passes through the porous wall of filtration element 19 and this portion, called the filtrate, exits treatment chamber 11 through flow outlet channel 21 completely devoid of inclusions. Despite the very small size of the pores in the filtration element, the flow of filtrate is considerable because of the substantial differential pressure that exists through the wall of filtration element 19. The remaining portion of liquid metal that does not pass through filtration element 19, which is called concentrate and contains impurities, is reintroduced into chamber 11 through conduit 22. Because of its high tangential speed controlled by pressure and flow regulator 23, this concentrate proceeds to clean the interior surface of filtration element 19 by continuously eliminating the inclusions and the impurities adhering to it which block the pores, again returning them to degassing chamber 14 where they will have another opportunity to be extracted by cleaning elements 16 and degassing elements 17.

This device is especially advantageous because it produces excellent tangential in-line filtration of any liquid metal, whatever its melting point.

Various modifications may be made to the device described. In particular, the filtration element may take the form of a porous cylindrical tube provided with one or more longitudinal channels, or it may take the form of a flat porous element. Further, the filtration device of the invention may be equipped with several filtration elements and several pumps, depending upon the amount of liquid metal to be treated. The device could also be provided with an additional pump to improve the cleaning performance of the filtration element by changing the direction and pressure of the liquid flowing through that element, or with a device to inject pressurized gas at one end or the other of said filtration element. In other embodiments of the invention, it would also be possible to incorporate the filtration element or the pressure regulating means within the pump body.

What is claimed is:

1. A method for in-line filtration of a liquid metal, the method comprising the steps of:

introducing the liquid metal into a treatment chamber;

cleaning and degassing the liquid metal;

pressurizing the liquid metal by injecting the liquid metal into a porous filtration element and tangential to a porous filtration surface of the filtration element;

maintaining a tangential flow of the liquid metal relative to the porous filtration surface of the filtration element so that a portion of the liquid metal filters through the porous filtration surface of the filtration element and forms a filtered liquid metal while a remaining portion of the tangential flow of liquid metal remains unfiltered and simultaneously cleanses the porous filtration surface of the filtration element;

evacuating the filtered liquid metal from the porous filtration element; and reintroducing the liquid metal which is unfiltered into the treatment chamber for further treatment.

2. The method according to claim 1, further comprising the step of cleaning the porous filtration surface of the filtration element by varying a speed at which the liquid metal to be filtered flows through in the filtration element.

3. The method according to claim 1, further comprising the step of cleansing the porous filtration surface of the filtration element by creating turbulence, in the flow of liquid metal to be filtered, along the porous filtration surface of filtration element.

4. A filtration device for in-line filtration of a liquid metal, the filtration device comprising:

a treatment chamber (11) including a refractory material and having an inlet channel (12) for supply a liquid metal to be filtered, the treatment chamber (11) comprising:

a cleansing element (16) for cleaning;

a degassing element (17) for degassing the cleaned metal;

a degassing chamber (14) containing both the cleansing element (16) and the degassing element (17);

a filtration and evacuation chamber (15) communicating with the degassing chamber (14) but being separated therefrom by a wall (13);

at least one porous filtration element (19) being accommodated by an enclosure (20) and the enclosure (20) having an outlet channel (21) for discharging filtered liquid metal;

at least one pump (18) with an inlet terminal (18a) and a re-circulation terminal (18b) for tangentially injecting the liquid metal to be filtered into the at least one porous filtration element (19);

a return mechanism for reintroducing unfiltered liquid metal, which passes through the at least one porous filtration element (19) without being filtered, back into the treatment chamber (11); and a pressure flow regulator (23) for regulating a pressure and flow rate of the unfiltered liquid metal.

5. The device according to claim 4, wherein the at least one porous filtration element (19) is located in a liquid metal flow path between the at least one pump (18) and the pressure flow regulator (23) for the filtered liquid metal.

6. The device according to claim 5, wherein an inlet of the at least one porous filtration element (19) is connected to the re-circulation terminal (18b) of the at least one pump (18) and an outlet of the at least one porous filtration element (19) is connected to the pressure flow regulator (23) for the unfiltered liquid metal.

7. The device according to claim 6, wherein an outlet of the pressure flow regulator (23) communicates, via a conduit (22), with a conduit opening formed into the wall (13) of the chamber (11) for reintroducing unfiltered liquid metal back into the into the degassing chamber (14).

8. The device according to claim 4, wherein the at least one pump (18), the filtration element (19) and the pressure flow regulator (23) are located in the filtration chamber (15).

9. The device according to claim 4, wherein the inlet terminal (18a) of the at least one pump (18) is located in a bottom area of the treatment chamber (11) adjacent the degassing element (17).

10. The device according to claim 4, wherein the at least one porous filtration element (19) has a plurality of pores, and a size of the pores in the at least one porous filtration element (19) varies depending upon a desired quality of the filtered metal.

11. The device according to claim 4, wherein the at least one porous filtration element (19) comprises a tubular element having at least one longitudinal channel formed therein.

12. The device according to claim 4, wherein the at least one porous filtration element (19) comprises a material selected from the group consisting of ceramic, graphite and a porous, refractory metal.

13. The device according to claim 4, wherein the at least one pump (18) comprises a material selected from the group consisting of ceramic, graphite and a porous, refractory metal.

14. The device according to claim 4, wherein the pressure flow regulator (23) comprises a material selected from the group consisting of ceramic, graphite and a porous, refractory metal.

15. A filtration device for in-line filtration of a liquid metal, the filtration device comprising:

a treatment chamber (11) having an inlet channel (12) for supply a liquid metal to be filtered, the treatment chamber (11) comprising:

a degassing chamber (14) containing a cleansing element (16) for cleaning and a degassing element (17) for degassing;

a filtration and evacuation chamber (15) communicating with the degassing chamber (14) but being separated therefrom by a partial wall (13);

a porous filtration element (19) being accommodated by an enclosure (20) and the enclosure (20) having an outlet channel (21) for discharging liquid metal filtered by the porous filtration element (19);

a pump (18) with an inlet terminal (18a) and a re-circulation terminal (18b) for tangentially injecting the liquid metal to be filtered into the porous filtration element (19);

a return conduit, connected to an outlet of the porous filtration element (19), for reintroducing unfiltered liquid metal, which passes through the at least one porous filtration element (19) without being filtered, back into the treatment chamber (11); and a pressure flow regulator (23) for regulating a pressure and flow rate of the unfiltered liquid metal passes through the porous filtration element (19).

* * * * *